United States Patent [19]
Chrestenson

[11] Patent Number: 5,630,556
[45] Date of Patent: May 20, 1997

[54] PORTABLE APPARATUS FOR COMMINUTING GYPSUM WALLBOARD

[76] Inventor: Robert A. Chrestenson, 981 Randy Way, Brentwood, Calif. 94513

[21] Appl. No.: 559,526

[22] Filed: Nov. 7, 1995

[51] Int. Cl.⁶ .................................................. B02C 21/02
[52] U.S. Cl. .......................... 241/79; 241/81; 241/101.76; 241/152.2; 241/193; 241/236
[58] Field of Search ........................... 241/236, 152.2, 241/101.76, 79, 101.77, 81, 73, 193, 300, 197, 294, 88.4, 154, DIG. 38

[56] References Cited

U.S. PATENT DOCUMENTS

| 2,525,023 | 10/1950 | Ensminger | 241/193 X |
|---|---|---|---|
| 4,374,573 | 2/1983 | Rouse et al. | 241/101.76 |
| 4,598,875 | 7/1986 | Bronson et al. | 241/101.76 X |
| 5,148,844 | 9/1992 | Robison | 241/101.76 X |
| 5,322,104 | 6/1994 | Morey et al. | 241/193 X |
| 5,390,862 | 2/1995 | Ellin | 241/152.2 X |
| 5,433,388 | 7/1995 | Hirz et al. | 241/DIG. 38 X |
| 5,497,949 | 3/1996 | Sharer | 241/152.2 X |

FOREIGN PATENT DOCUMENTS 132236  9/1978  Germany ..................... 241/152.2

*Primary Examiner*—Mark Rosenbaum
*Attorney, Agent, or Firm*—Thomas R. Lampe

[57] ABSTRACT

Portable apparatus for comminuting gypsum wallboard includes a rigid truck trailer platform having two hoppers mounted thereon. Rotary milling units are in one hopper and a chain mill in the other hopper. Wallboard is sequentially passed through the hoppers and a conveyor transports wallboard between the hoppers.

15 Claims, 3 Drawing Sheets

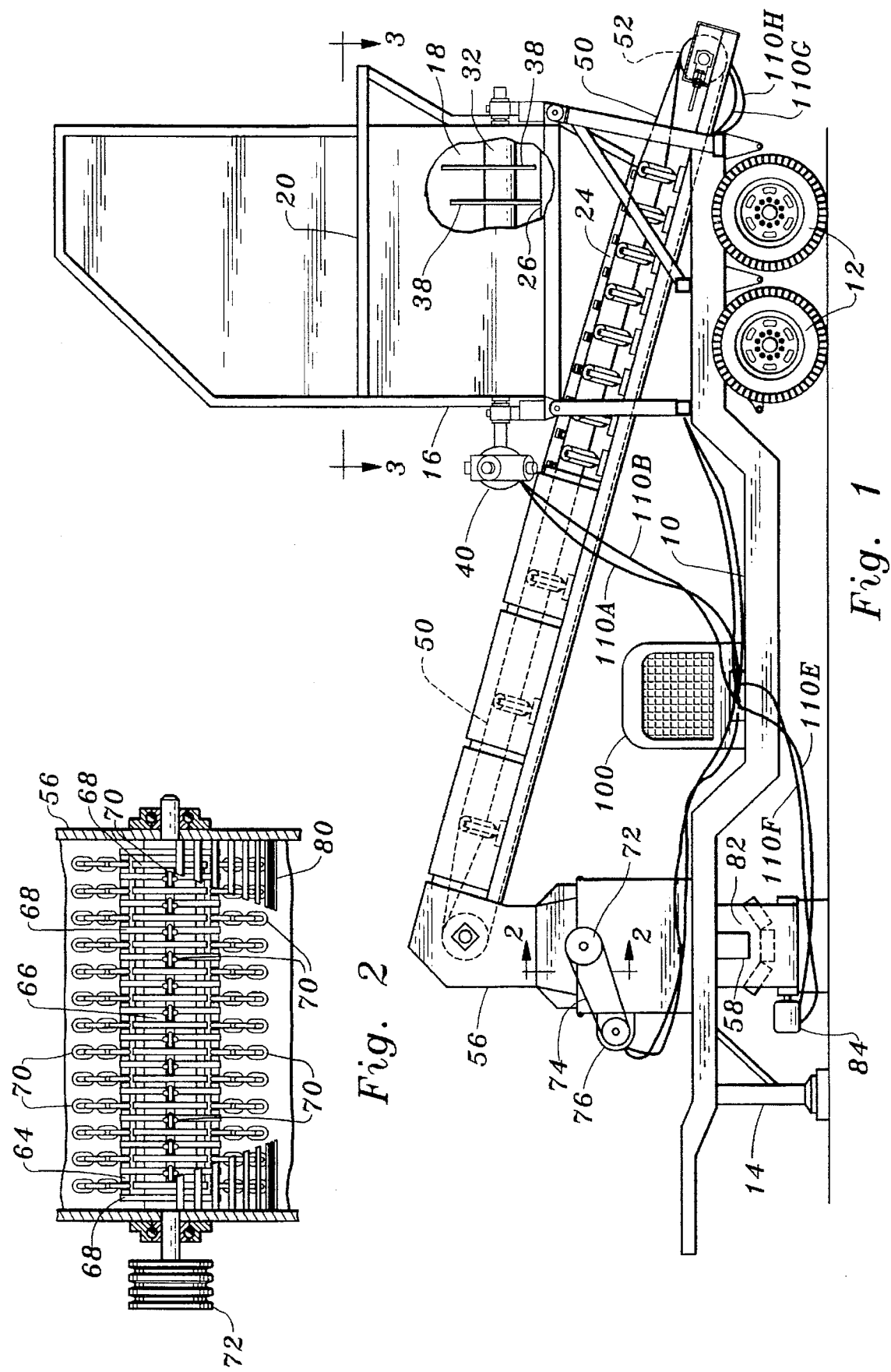

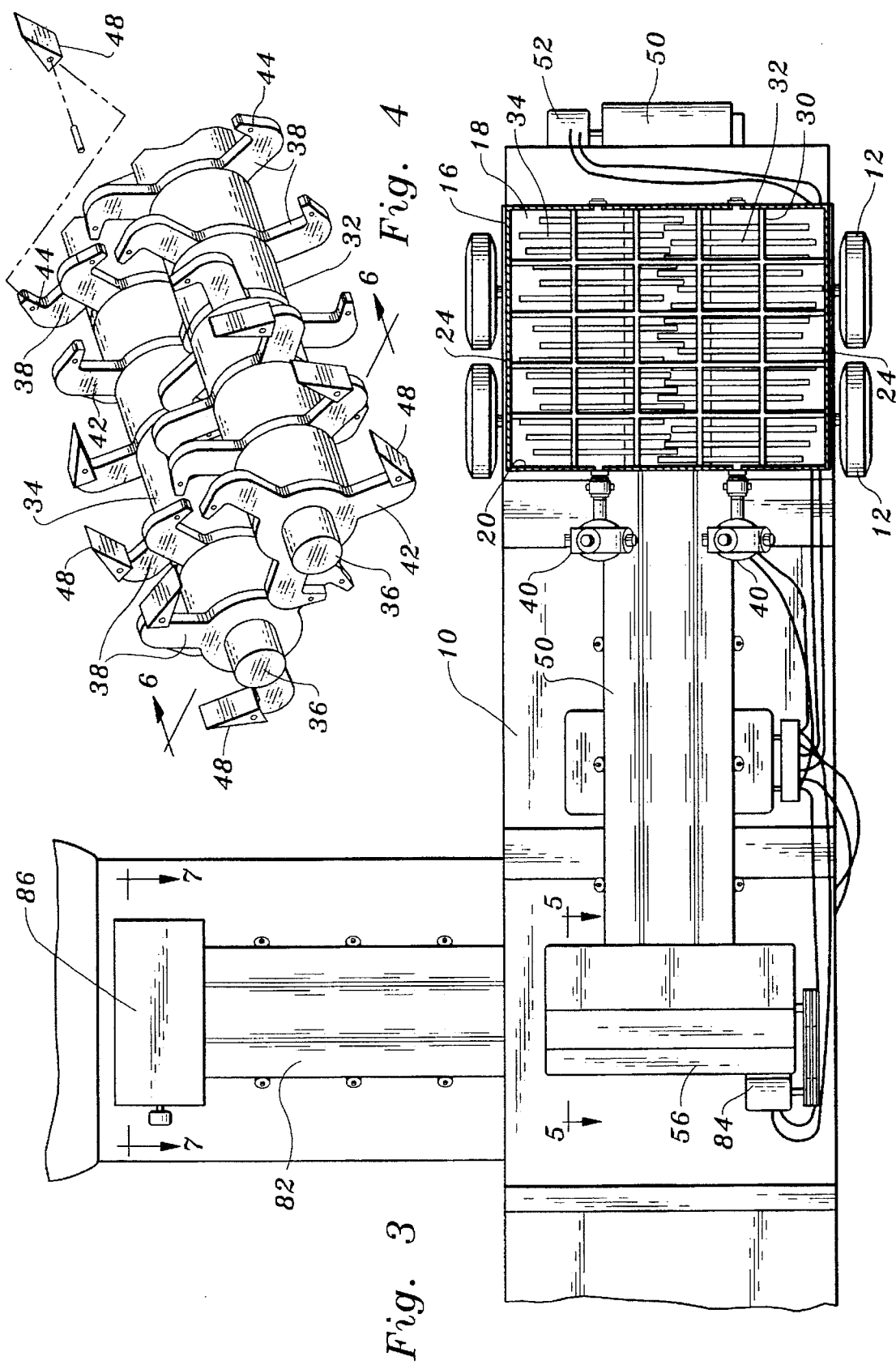

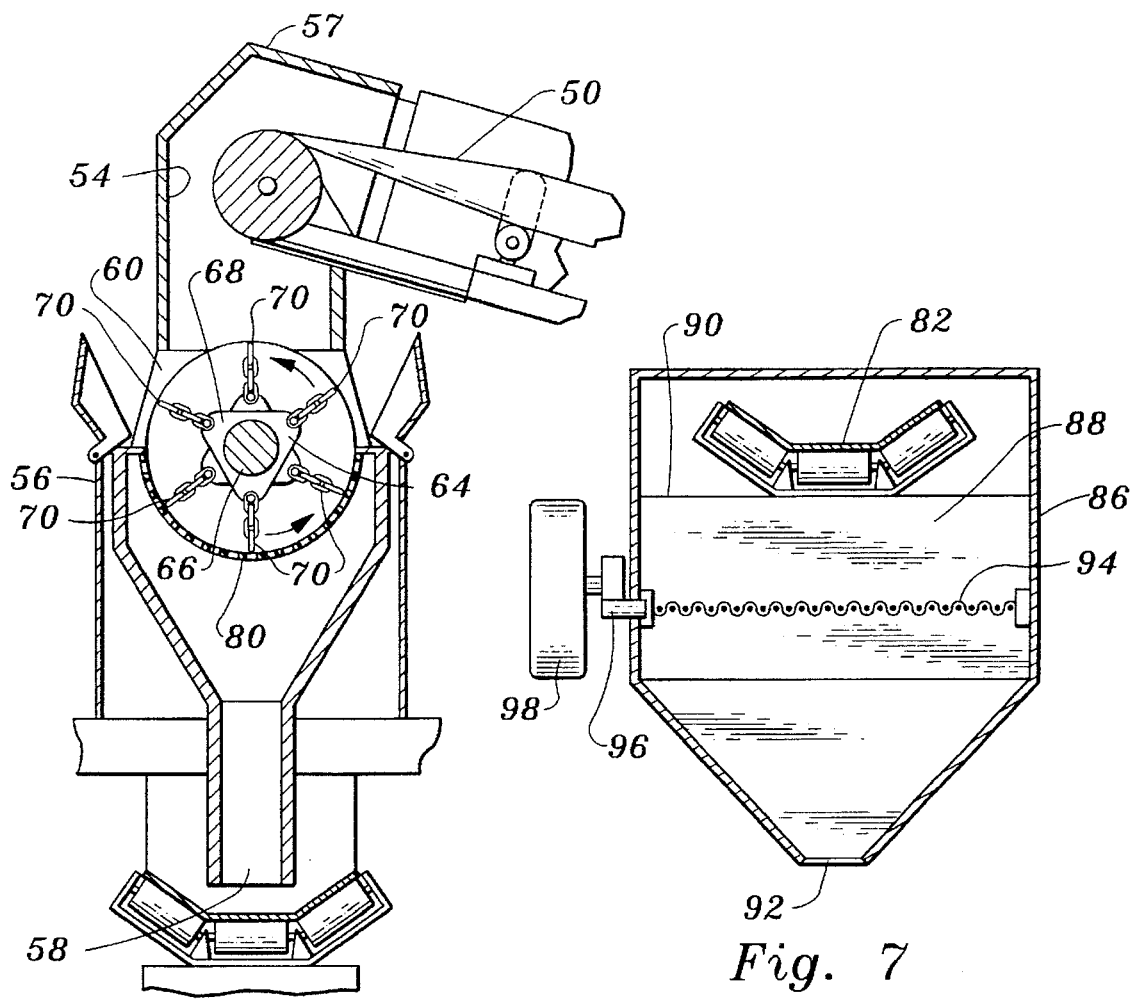
Fig. 5
Fig. 7
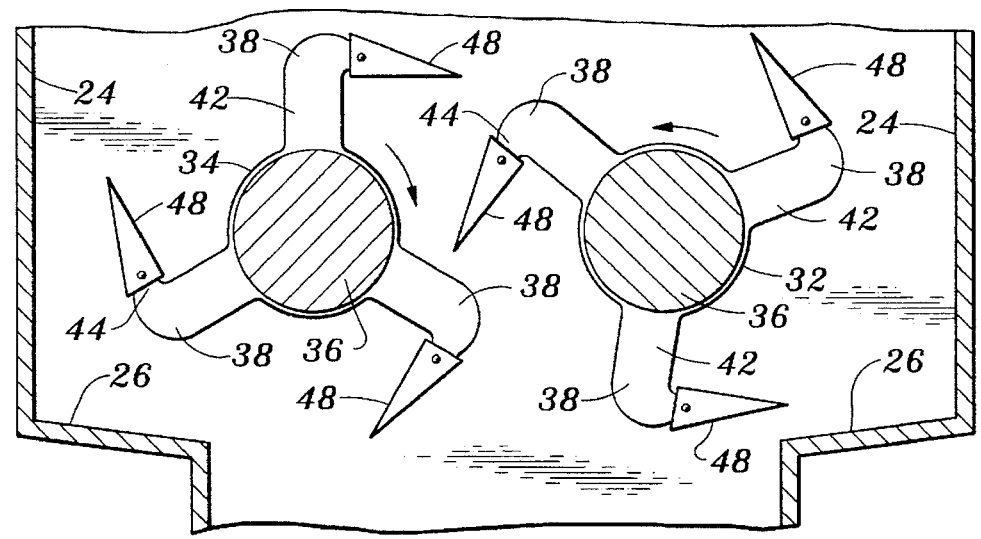
Fig. 6

PORTABLE APPARATUS FOR COMMINUTING GYPSUM WALLBOARD

TECHNICAL FIELD

This invention relates to apparatus which readily can be conveyed from site to site and utilized to comminute or pulverize gypsum wallboard, e.g., for recycling.

BACKGROUND ART

Gypsum wallboard is widely utilized in the construction industry and is employed in millions of structures in the United States and elsewhere. When buildings are demolished or renovated vast amounts of gypsum wallboard become scrap. It is environmentally unsound to bury this waste.

While gypsum wallboard has been recycled, equipment for doing so has been characterized by its relatively high cost, complexity, and expense of operation. Furthermore, such facilities are normally fixed in place at a single specific site and remain there on a permanent basis. It is not always convenient or economically sound to ship scrap wallboard to such sites. Furthermore, the capacity of such permanent reprocessing facilities may exceed the supply of wallboard available at such location. This can result in significant downtime and economic loss.

DISCLOSURE OF INVENTION

The present invention relates to a portable apparatus which readily can be moved from site to site and which inexpensively, efficiently, and effectively comminutes gypsum wallboard for recycling.

The portable apparatus of the present invention includes a unitary, rigid platform having wheels rotatably connected thereto for supporting the platform.

A first hopper is mounted on the platform which defines a first hopper interior for receiving gypsum wallboard. The first hopper has a first hopper inlet and a first hopper outlet communicating with the first hopper interior.

A plurality of rotary milling units are mounted for rotational movement in the first hopper interior. Each rotary milling unit includes an elongated shaft and a plurality of milling arms connected to the elongated shaft at spaced locations on the elongated shaft. The milling arms project outwardly from the elongated shaft. The milling arms have distal ends. The milling arms of adjacent rotary milling units intermesh to define a plurality of restricted passageways.

Rotary milling unit drive means is provided for rotating the rotary milling units.

A first conveyor is mounted on the platform for receiving wallboard pieces exiting the first hopper outlet and for transporting the wallboard pieces. The apparatus also includes first conveyor drive means on the platform for driving the first conveyor.

A second hopper is mounted on the platform at a location thereon spaced from the first hopper. The second hopper has second hopper side walls defining a second hopper interior for receiving wallboard pieces transported from the first hopper by the first conveyor. The second hopper has a second hopper inlet and a second hopper outlet communicating with the second hopper interior.

A rotatable chain mill is mounted for rotational movement in the second hopper interior. The rotatable chain mill includes a rigid elongated member and a plurality of chains connected to the rigid elongated member about the periphery of the rigid elongated member at spaced locations along the length thereof. The chains have free distal ends which move away from the rigid elongated member due to centrifugal force and are positioned closely adjacent to the second hopper side walls upon rotation of the rigid elongated member. Chain mill drive means is provided for rotating the chain mill.

A second conveyor is provided for receiving comminuted wallboard particles exiting from the second hopper outlet after comminution of the wallboard pieces by the chain mill. The second conveyor is for transporting the comminuted wallboard pieces to a location spaced from the second hopper. Second conveyor drive means is provided for driving the second conveyor.

Other features, advantages, and objects of the present invention will become apparent with reference to the following description and accompanying drawings.

BRIEF DESCRIPTION OF DRAWINGS

FIG. 1 is a right side, elevation view of apparatus constructed in accordance with the teachings of the present invention;

FIG. 2 is an enlarged sectional view taken along the line 2—2 in FIG. 1;

FIG. 3 is a partial sectional, top plan view of the apparatus, the section being taken along line 3—3 in FIG. 1;

FIG. 4 is a partial perspective view of rotary milling units employed in the apparatus;

FIG. 5 is an enlarged sectional view taken along the line 5—5 in FIG. 3;

FIG. 6 is a greatly enlarged elevation section of the rotary milling units taken along the line 6—6 in FIG. 4; and FIG. 7 is an enlarged sectional view taken along the line 7—7 in FIG. 3;

BEST MODE FOR CARRYING OUT THE INVENTION

Referring now to the drawings, apparatus constructed in accordance with the teachings of the present invention includes a rigid truck trailer platform 10 with wheels 12. The end of the truck trailer platform opposed to the end thereof with the wheels has a jack member 14 to stabilize, level, and support the platform when on site. The jack member end of the platform is connected to a truck tractor (not shown) in the usual fashion when transport of the platform and equipment mounted thereon occurs.

The apparatus includes a first hopper 16 mounted on the platform 10. Hopper 16 defines an interior 18 and has an inlet 20 and an outlet 22 communicating with the interior 18.

First hopper 16 includes opposed side walls 24 which converge inwardly toward one another in a downward direction. At a location between the inlet and outlet of the first hopper the side walls converge sharply toward one another momentarily to form impact surfaces 26 which, in the arrangement illustrated, are almost horizontal.

A grid 30 comprised of intersecting steel rods or the like is located adjacent to the inlet of the hopper to limit the size of gypsum wallboard received by the hopper interior 18. Wallboard fed through the first hopper inlet and which passes through the grid adjacent to side walls 24 can fall under the influence of gravity and strike impact surfaces 26 to facilitate breaking up of the wallboard.

Two rotary milling or chopper units 32, 34 are mounted for rotational movement in the first hopper interior. Each of the rotary milling units includes an elongated shaft 36 and a plurality of milling arms 38 connected to the elongated shaft at spaced locations thereon. The milling arms of adjacent rotary milling units intermesh to define a plurality of restricted passageways. The elongated shafts and milling arms of the two rotary milling units rotate in opposite directions, as shown, for example, in FIG. 6 by the arrows. Rotation is effected by hydraulic motors 40 attached to the elongated shafts.

Each milling arm 38 include a primary arm segment 42 projecting radially outwardly from its respective elongated shaft and orthogonally with respect to the rotational axis of the elongated shaft. Furthermore, each milling arm also includes a laterally directed distal arm segment 44 projecting in the direction of rotation of the elongated shaft to which it is attached. It has been found that such a configuration is very effective in breaking up gypsum wallboard which passes downwardly through the first hopper interior and thence between the rotary milling units 32, 34.

Preferably caps or covers 48 are positioned over distal arm segments 44 and secured thereto by bolts or other suitable mechanical fasteners. In the interest of simplicity, caps or covers 48 are only illustrated in FIGS. 4 and 6, and in the former Figure only in connection with some of the distal arm segments. In actual practice, these covers, which are generally triangular shaped in cross-section and come to a point, are on all of the distal arm segments to assure that the arms themselves will not be worn during operation. The teeth-like caps or covers, on the other hand, can readily be replaced when worn.

Disposed under the first hopper outlet 22 is a belt conveyor 50 which is driven by a hydraulic motor 52. The conveyor 50 receives wallboard pieces exiting from the first hopper outlet and transports them upwardly at an angle of inclination to the inlet 54 of a second hopper 56. A hood 57 is located above and about the inlet to minimize passage of particulate material into the ambient atmosphere. Hopper 56 and the structure of belt conveyor 50 are mounted on the platform 10 along with the first hopper 20 described above. Second hopper 56 also has an outlet 58. Second hopper inlet 54 and second hopper outlet 58 communicate with the interior 60 of the second hopper defined by the side walls thereof.

A rotatable chain mill 64 is mounted for rotational movement in the second hopper interior. Chain mill 64 includes an elongated member or shaft 66 which is journaled at the side walls of the hopper 56. A plurality of generally triangular-shaped rigid supports 68 are spaced along the rigid elongated member 66, rigidly affixed thereto, as by welding, and project radially outwardly therefrom. The orientations of adjacent rigid supports 68 are ninety degrees out of phase.

A chain 70 is attached at each of the three apexes of rigid supports 68. FIGS. 2 and 5 show the positions of these chains when the chain mill is being rotated. In such condition, the free distal ends of the chains have moved away from the rigid elongated member due to centrifugal force and are positioned closely adjacent to the second hopper side walls upon rotation of the rigid elongated member 66. The rigid elongated member 66 has a pulley 72 at one end thereof which is connected by a belt 74 to a hydraulic motor 76.

Wallboard pieces transferred to second hopper 56 by conveyor 50 will fall downwardly under the influence of gravity into the hopper interior 60 and engage the rotating chain mill, and more particularly the chains 70 thereof. A grate 80 is disposed below the rotatable chain mill 64, the grate having a semi-circular cross-section and positioned closely adjacent to the chain distal ends upon rotation of the chain mill. The gypsum wallboard pieces fed to second hopper 56 will be further comminuted by the chain mill and pass through the grate and thence out of the second hopper outlet 58.

A second belt conveyor 82 driven by a hydraulic motor 84 is positioned below the second hopper 58 to receive the comminuted gypsum wallboard therefrom. Conveyor 82 transports such material to a third hopper 86. Third hopper 86 has an interior 88 as well as an inlet 90 and an outlet 92 communicating with the interior. A screen 94 is located within the third hopper interior to screen comminuted gypsum wallboard prior to passage thereof out outlet 92. In the arrangement illustrated, a shaker or vibrator 96 is provided to facilitate the screening action. Suitably, a hydraulic motor 98 is operatively associated with the screen shaker to operate same.

A central source of pressurized hydraulic fluid is operatively associated with each of the hydraulic motors described above. Reference numeral 100 designates a prime mover-hydraulic pump combination of any suitable commercial type which may be employed to power the various components of the apparatus. Inlet and outlet conduits 110A–110H are provided between pressurized hydraulic fluid source 100 and the various hydraulic motors. Furthermore, separate valves are suitable employed to control the flow of pressurized hydraulic fluid to the various hydraulic motors. In the interest of simplicity, such valving has not been illustrated.

I claim:

1. Portable apparatus for comminuting gypsum wallboard, said portable apparatus comprising, in combination:

a unitary, rigid platform;

wheels rotatably connected to said platform for supporting said platform;

a first hopper mounted on said platform defining a first hopper interior for receiving gypsum wallboard and having a first hopper inlet and a first hopper outlet communicating with said first hopper interior;

a plurality of rotary milling units mounted for rotational movement in said first hopper interior, each said rotary milling unit including an elongated shaft and a plurality of milling arms connected to said elongated shaft at spaced locations on said elongated shaft and projecting outwardly from said elongated shaft, said milling arms having distal ends, and milling arms of adjacent rotary milling units intermeshing to define a plurality of restricted passageways;

rotary milling unit drive means for rotating said rotary milling units;

a first conveyor mounted on said platform for receiving wallboard pieces exiting said first hopper outlet and for transporting said wallboard pieces;

first conveyor drive means on said platform for driving said first conveyor;

a second hopper mounted on said platform at a location thereon spaced from said first hopper, said second hopper having second hopper side walls defining a second hopper interior for receiving wallboard pieces transported from said first hopper by said first conveyor, said second hopper having a second hopper inlet and a second hopper outlet communicating with said second hopper interior;

a rotatable chain mill mounted for rotational movement in said second hopper interior, said rotatable chain mill including a rigid elongated member and a plurality of chains connected to said rigid elongated member about the periphery of said rigid elongated member at spaced locations along the length thereof, said chains having free distal ends which move away from said rigid elongated member due to centrifugal force and are positioned closely adjacent to said second hopper side walls upon rotation of said rigid elongated member;

chain mill drive means for rotating said chain mill;

a second conveyer for receiving comminuted wallboard particles exiting from said second hopper outlet after comminution of said wallboard pieces by said chain mill and for transporting said comminuted wallboard particles to a location spaced from said second hopper; and second conveyor drive means for driving said second conveyor.

2. The portable apparatus according to claim 1 wherein said unitary, rigid platform is a truck trailer platform.

3. The portable apparatus according to claim 1 wherein said portable apparatus additionally comprises a third hopper spaced from said second hopper, said third hopper defining a third hopper interior and having a third hopper inlet and a third hopper outlet communicating with said third hopper interior, and a screen located within said third hopper, said second conveyor transporting said comminuted wallboard particles to said third hopper inlet for passage through the screen in said third hopper interior and out of said third hopper outlet.

4. The portable apparatus according to claim 3 additionally comprising shaker means for shaking said screen to facilitate passage of said comminuted wallboard particles through said screen.

5. The portable apparatus according to claim 1 additionally comprising a grid disposed above said first hopper interior at said first hopper inlet for limiting the size of gypsum wallboard received by said first hopper interior.

6. The portable apparatus according to claim 1 wherein said first hopper includes first hopper side walls which converge in a downward direction and form an impact surface impacted by wallboard in said hopper interior.

7. The portable apparatus according to claim 1 additionally comprising a grille within said second hopper interior between said second hopper outlet and said chain mill.

8. The portable apparatus according to claim 1 wherein said rotary milling unit drive means and said chain mill drive means comprise hydraulic motors, said apparatus additionally comprising a source of pressurized fluid for providing pressurized fluid to said hydraulic motors.

9. The portable apparatus according to claim 8 wherein said source of pressurized fluid includes a prime mover driven pump mounted on said unitary, rigid platform.

10. The portable apparatus according to claim 8 wherein said first conveyor and said second conveyor each include a hydraulic drive motor, said hydraulic drive motors being in operative association with said source of pressurized fluid.

11. The portable apparatus according to claim 1 wherein at least some of said milling arms include a primary arm segment projecting radially outwardly from said elongated shaft and orthogonally with respect to the rotational axis of said elongated shaft and a laterally directed distal arm segment projecting in the direction of rotation of said elongated shaft.

12. The portable apparatus according to claim 11 wherein each milling unit additionally comprises cap members positioned over the distal arm segments and releasably secured thereto.

13. The portable apparatus according to claim 1 wherein said first conveyor is disposed at an incline relative to said unitary, rigid platform for transporting said wallboard pieces upwardly between said first hopper and said second hopper.

14. The portable apparatus according to claim 1 wherein said chain mill additionally comprises a plurality of rigid supports spaced along said rigid elongated member, rigidly affixed thereto, and projecting radially outwardly therefrom, said chains being directly connected to said rigid supports.

15. The portable apparatus according to claim 1 additionally comprising a grate below and immediately adjacent to said rotatable chain mill.

* * * * *